United States Patent

[11] 3,620,419

| [72] | Inventor | Alfred J. Bailey<br>Berkeswell, England |
|---|---|---|
| [21] | Appl. No. | 862,236 |
| [22] | Filed | Sept. 30, 1969 |
| [45] | Patented | Nov. 16, 1971 |
| [73] | Assignee | Massey-Ferguson Services N.V.<br>Curacao, Netherlands |
| [32] | Priority | Oct. 3, 1968 |
| [33] | | Great Britain |
| [31] | | 46970/68 |

[54] METERING DEVICES
10 Claims, 5 Drawing Figs.

[52] U.S. Cl. ................................................. 222/298,
222/177, 222/303, 222/313, 222/410
[51] Int. Cl. .................................................. G01f 11/06
[50] Field of Search ........................................... 222/176,
177, 178, 410, 313, 343, 291, 298, 299, 303, 304,
315, 307

[56] References Cited
UNITED STATES PATENTS

| 92,681 | 7/1869 | Weusthoff et al. ............ | 222/298 |
| 2,661,124 | 12/1953 | Ajero .......................... | 222/177 |
| 3,387,751 | 6/1968 | Olsson ......................... | 222/315 X |
| 3,470,994 | 10/1969 | Schnell et al. ................ | 222/177 X |

FOREIGN PATENTS

| 367,730 | 1/1923 | Germany ...................... | 222/298 |
| 964,279 | 7/1964 | Great Britain ................ | 222/298 |
| 25,135 | 11/1906 | Sweden ....................... | 222/298 |

*Primary Examiner*—Lloyd L. King
*Assistant Examiner*—Thomas C. Culp, Jr.
*Attorney*—Gerhardt, Greenlee & Farris ABSTRACT: A metering device for seed comprising a body, a rotary metering member with a fluted portion for conveying seed, a cylindrical portion, a sealing disc with a central hole of complementary configuration to the fluted portion of the metering member, and a spring clip for holding the sealing disc in operating position. By releasing the spring clips, the sealing disc and the metering member can be moved toward one side of the device a sufficient distance to allow the metering member to be withdrawn from the body in a direction transverse to the axis of rotation of the metering member.

Inventor
ALFRED J. BAILEY

Inventor
ALFRED J. BAILEY

METERING DEVICES

This invention relates to a metering device for seed or fertilizer, hereinafter and in the appended claims referred to as seed, and especially but not exclusively for use in a combined seed-and-fertilizer drill.

According to the present invention there is provided a metering device for seed comprising a body and a rotary metering member mounted in said body, said metering member being movable along its rotary axis between an in-use position and an out-of-use position from which the member may be withdrawn from the body in a direction transverse to said axis.

Preferably, the member is axially adjustable in its in-use position so as to vary the metering effect.

Preferably also, the metering member includes a fluted portion for conveying seed, and a substantially cylindrical portion.

In use, the metering member may be restrained from moving from the in-use position to the out-of-use position by a spring clip, and a cutoff flap may be provided which is spring biased towards said cylindrical portion.

The fluted portion may have an extension mounted on a shaft and rotatable within the cylindrical portion, and a locking ring may be provided which prevents axial movement of the cylindrical portion relative to the extension.

The fluted portion may be slidably mounted in a sealing disc having a peripheral flange.

The body may include a pair of parallel sidewalls, of which one has a circular aperture of substantially the same diameter as that of the sealing disc and has a slot open to said aperture and having a width substantially the same as the diameter of said cylindrical portion, and the other of which has a similar aperture and slot having a diameter and width, respectively, substantially the same as the diameter of the cylindrical portion and the width of said shaft, so that, when the metering member is in said in-use position, it is journalled in said apertures, and, when the metering member is in said out-of-use position, the cylindrical portion and the shaft are opposite. The metering member may be withdrawn from the body through the slots in a direction transverse to said rotary axis.

An embodiment of the invention will now be described by way of example, with reference to the accompanying drawings, in which.

Figure 1:
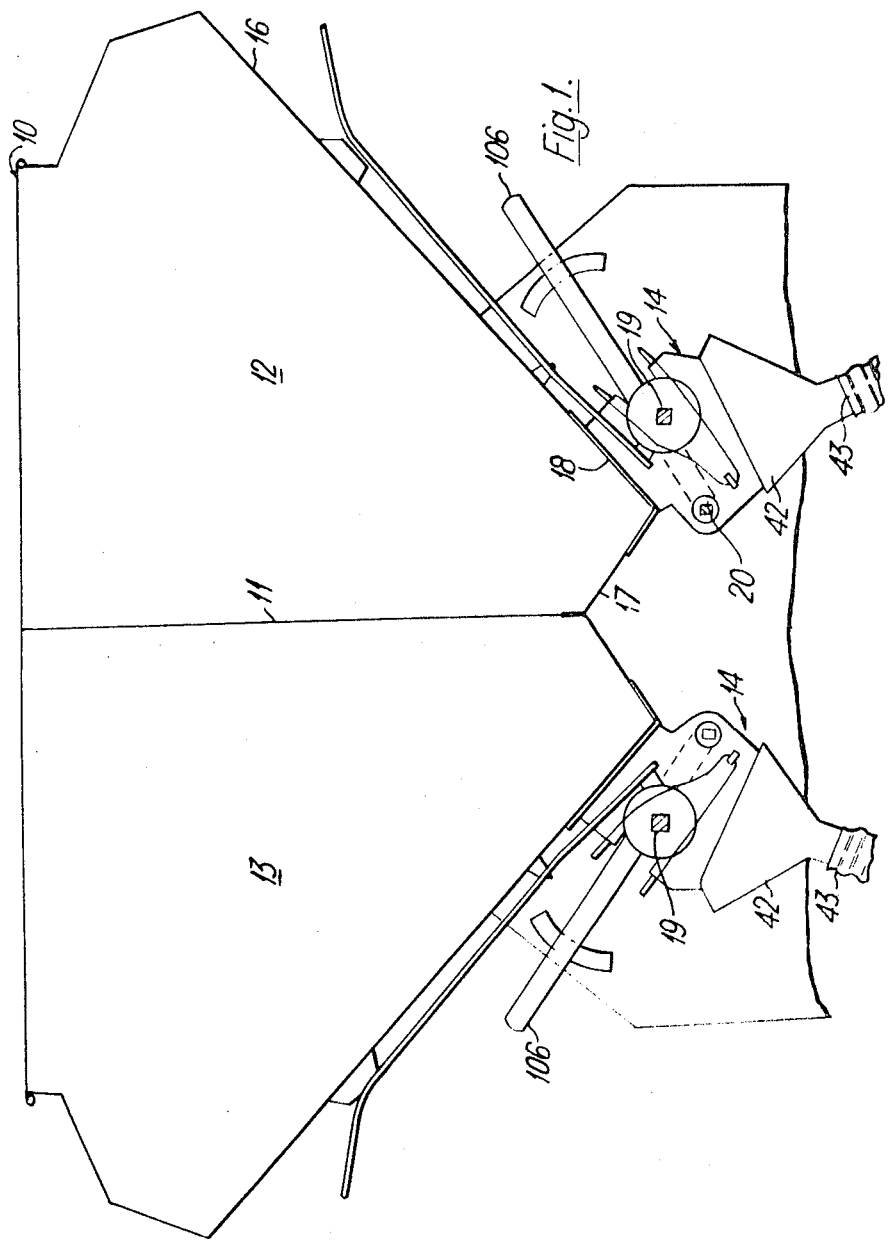
FIG. 1 is a diagrammatic end view of a portion of a combined seed-and-fertilizer drill including metering devices according to the present invention.

Referring to the drawings, FIG. 1 shows a combined seed-and-fertilizer drill including a hopper 10 having a vertical partition 11 dividing it into a seed and a fertilizer compartment 12 and 13, respectively. The compartments 12 and 13 are similar and each has associated with it a series of metering devices 14. The metering devices 14 are similar for seed and for fertilizer, thus, only the seed compartment 12 and its associated metering devices 14 will be described.

The seed compartment 12 includes an upwardly and forwardly inclined front wall 16 meeting, at its lower end, and oppositely inclined rear wall 17. The metering devices 14 are transversely spaced across the hopper and cooperate with a series of outlets 18 (FIG. 3) at the lower end of the front wall 16. A drive shaft 19 and a control shaft 20 extend across the machine and pass through each of the metering devices 14 for a purpose which will be hereinafter described.

Figure 2:
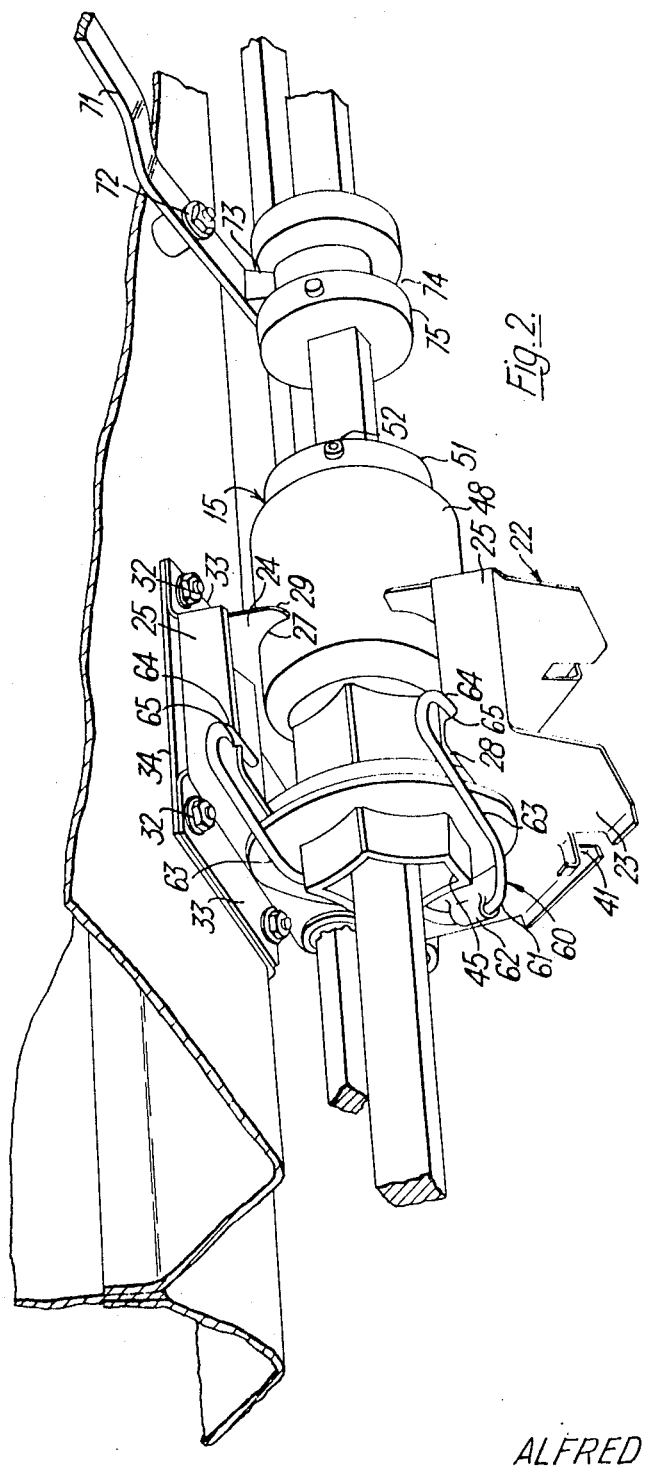
FIG. 2 is a perspective view of a metering device.
Figure 3:
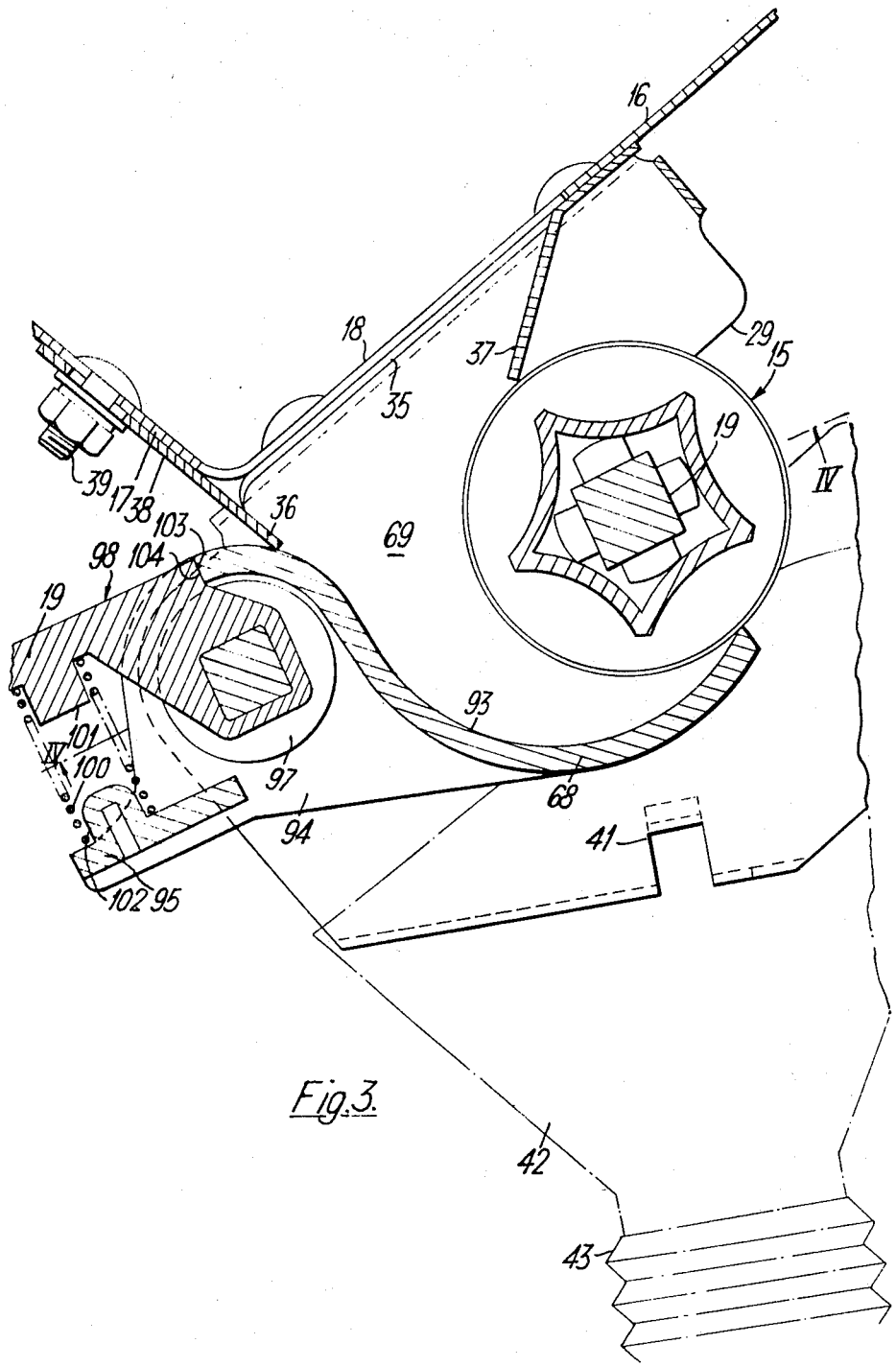
FIG. 3 is a sectional end view of the metering device according to FIG. 2.

Referring to FIGS. 2 and 3, each metering device comprises a body 22 having a pair of sidewalls 23, 24 interconnected by cross members 25. The sidewalls 23 and 24 include circular apertures 26 and 27, respectively, in which a rotary metering member 15 is journaled. Slots 28, 29 open into and extend rearwardly from the apertures 26 and 27, respectively, to facilitate removal of the metering member 15 in a manner to be described.

The body 22 is attached to the wall 16 of the seed compartment 12 by bolts 32 passing through outwardly bent flanges 33 on the body 22, and through an upper guide plate 34. The guide plate 34 includes a rectangular opening 35 which mates with one of the outlets 18; guide flanges 36, 37 being provided so that the plate 34 forms a downwardly extending funnel for directing seed into the metering device 14. An upwardly extending flange 38 on the plate 34 is attached to the compartment wall 17 by bolts 39.

The lower portion of each wall 23, 24 is provided with an outwardly extending hook 41 for attaching a seed or fertilizer boot 42 through which seed passes to seed tubes 43 and hence to coulters (not shown).

The rotary metering member 15 comprises a fluted metering wheel or portion 45 having a tubular extension 46 nonrotatably mounted on the drive shaft 19, and a cylindrical cutoff element or portion 48 freely rotatably mounted on a raised bearing surface on the extension 46. The element 48 is provided, at its end remote from the bearing surface 47, with an inwardly directed bearing portion 49 which cooperates with the extension 46 to form a second bearing support pivot. Thus the cutoff element 48 is only supported at its ends, the major portion of its length having a gap between it and the extension 46 thus minimizing the possibility of seizure, particularly when the device is being used for metering fertilizer. The outer diameter of the cutoff element 48 is the same as the diameter of the aperture 27 in the body 22.

Axial movement of the extension 46 and the cutoff element 48 is prevented by a locking ring 51 mounted on the extension 46 and rigidly located by a setscrew 52 extending through the extension 46 and engaging the drive shaft 19.

A sealing disc 56 is provided and includes a flange 57 and an inwardly directed portion 58; the latter being of similar diameter to the aperture 26 in the body 22. The disc 56 has a central hole 59 of complementary configuration to the fluted metering wheel 45 and the latter is mounted therein for axial sliding movement relative thereto. A spring clip 60 of generally U-shape has its base 61 pivotally mounted on a tongue 62 on the body 22 and has side arms 63 which extend over the flange 57 and is held in position by downturned portions 64 which engage with notches 65 in the cross members 25. The spring clip 60 acts when in the position shown in the drawings, to hold the inner face of the flange 57 against a bearing surface 66 provided on the sidewall 23. Moreover, the inwardly directed portion 58, in cooperation with the aperture 26 provides radial location of the rotary metering member 15. In use the sealing disc 56 rotates with the fluted portion 45.

A cutoff flap 68, which is spring urged towards the cutoff element 48 and which will be described in more detail hereinafter, forms the final part of the metering device.

In use, seed from the compartment 12 passes through the outlet 16 and hole 35 and is confined in a meter compartment 69 formed by the sidewalls 23, 24, the cutoff flap 68, and the fluted portion 45. Spillage through the holes 26, 27 is prevented by the cutoff element 48 and the sealing disc 56. Rotation of the drive shaft 19 causes the fluted portion 45 to rotate, thus conveying the seed over the flap 68 and allowing it to drop into the boot 42. The rate at which the seed is metered out is dependent on the speed of the shaft 19 and also on the width of the part of the fluted portion 45 which is within the compartment 69. To enable adjustment of the aforementioned width of fluted portion the cutoff element 48 and the locking ring 51 is slidable axially by a hand lever 71 pivotally mounted at 72 on the hopper 10. The lever 71 includes a projection 73 which engages an annular recess 74 in a cylindrical block 75 rigidly mounted on the shaft 19.

The sealing disc 56 is restrained from moving axially by the spring clip 60 and provides a limit stop to movement of the drive shaft 19 when the end face 77 of the cutoff element 48 abuts the inner face 79 of the disc 56. In this position the cutoff element 48 extends over the full width of the compartment 69 and there is no flow of material through the hole 27, even on rotation of the drive shaft 19.

The drive shaft 19 passes through an entire series of metering devices 14, thus rotation of the lever 71 provides simultaneous adjustment of all of the devices.

A rectangular tubular shaft 82 is axially slidable in a drive gear 83 journalled in a plate 84 at one end of the hopper 10. The shaft 82 carries, at one end, a boss 85 which mates with the drive shaft 19 and has an end face 86 which abuts the end of the fluted portion 45 of the first metering device of a series. A pin 87 holds the shaft 19 and boss 85 in axial engagement when the metering devices are in use.

Figure 4:
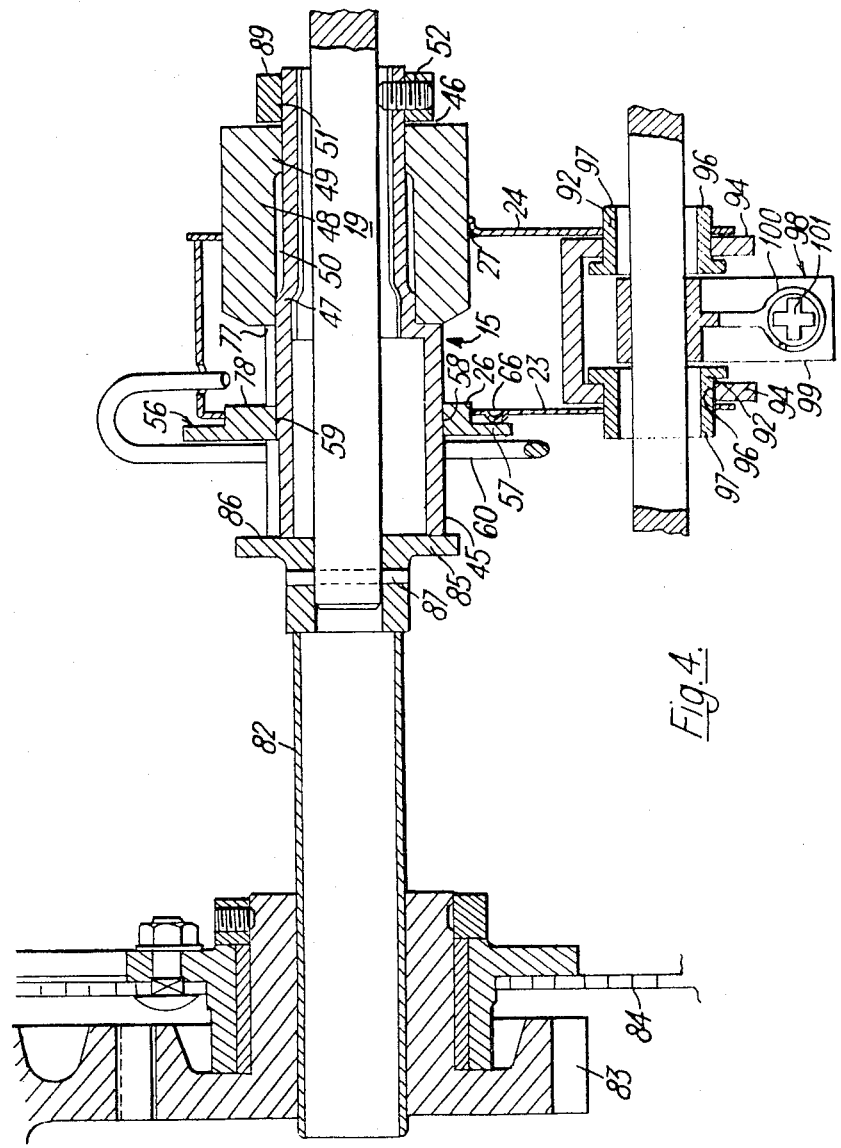
FIG. 4 is a view on the line IV—IV of FIG. 3.

With seed and fertilizer metering devices, it is often required to remove the metering member for cleaning. This may be readily accomplished with the above-described construction in the following manner:

The pin 87 is removed and the shaft 82 is moved to the left as viewed in FIG. 4. The spring clip 60 on each metering device 14 is then unfastened and allowed to drop down about its pivot 62. Movement of the handle 71 to move the shaft and associated parts to the left into an out-of-use position is then possible. In the out-of-use position the end face 89 of the locking ring 51 is just to the left of the wall 24. The size of the slots 28, 29 are such that in this out-of-use position the element 48 can pass through slot 28 and the shaft 19 through the slot 29. Thus, the metering member 15 may now be withdrawn from the body 22 in a direction transverse of the rotary axis of the metering member 15.

Figure 5:
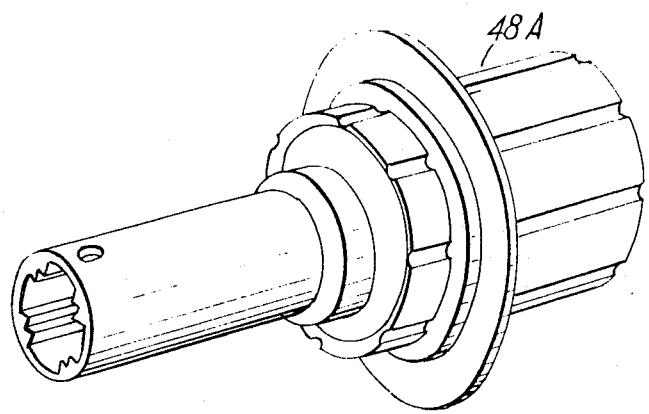
FIG. 5 is a perspective view of a modified detail of the metering device according to FIGS. 2 to 4.

This facility for easy removal also enables the fluted portion 48 and its associated sealing disc 56 to be easily changed for other similar parts. A modified fluted portion 48A having smaller flutes to enable sowing of small seeds such as vegetable seeds is shown in FIG. 5.

The cutoff flap 68 comprises a flap portion 93 of generally arcuate shape having depending therefrom a pair of spaced sidewalls 94, interconnected at their lower ends by a cross member 95. Each sidewall 94 is provided with a hole 96 containing a bearing 97 which extends through a hole 92 in the associated sidewall 23 or 24 so as to locate the flap portion 93. The rectangular shaft 20 which passes transversely across the hopper 10 through all the metering devices 14 extends through the bearing 97 and the latter rotates the shaft 20.

A spring control plate 98 is provided on the shaft 20 and is rotatable therewith between the bearing 97. The plate 98 includes an arm 99, and a spring 100 extends between locators 101, 102, on the arm 99 and cross member 95, respectively. A stop 103 on the plate 98 normally abuts the rear face 104 of the flap 68, the arrangement being such that, as shown in FIG. 3, the spring 100 tends to rotate the flap portion 93 anticlockwise to urge the stop and the face 103, 104, respectively, into engagement. In this condition there is still some stress in the spring 100.

The position of the control plate 93 is flap by rotation of the shaft 20, this being under the control of a lever 106, mounted at one end of the hopper 10. In the position shown in FIG. 3 the flap portion 93 is just engaging the cutoff element 48, this being the usual position when sowing cereals. If a blockage should occur or foreign material pass into the metering device the flap portion 93 will be forced open against the pressure of the spring 100 to assist in clearing the device and the pressure at which the flap portion 93 commences to open is adjustable by rotation of the shaft 20. For example, if the shaft 20 is rotated anticlockwise (FIG. 3) the spring pressures will be increased.

The above-described flap arrangement also facilitates sowing of larger seeds such as beans, as clockwise rotation of the shaft 20 brings the control plate 98 into contact with the abutment 104 after which the flap portion 93 rotates with the plate 98 to provide a larger gap between the fluted portion 45 and the flap portion 93. Hence a larger opening is provided for seed to pass through. If the flap portion 93 is not contacting the element 48 movement of the flap portion 93 in excess of that determined by the setting of the shaft 20 can only take place after the precompression on the spring 100 has been overcome.

The metering device described above has the advantages of being suitable for either seed or fertilizer and of being cheap to manufacture.

Corrosion is a problem with metering devices, especially when they are used for fertilizer. Thus, it is preferable that as many of the components of the metering device as possible are manufactured from noncorrosive material. In the above-described embodiment the fluted portion 46, the extension 45, the cutoff element 48, the sealing disc 56, the cutoff flap 68, the control plate 98 and the bearings 97 may all be manufactured from nylon or other plastics material. Moreover, the body 22 may be manufactured from a single piece of sheet metal and subsequently coated with nylon or epoxy resin.

What we claim is:

1. A metering device for seed comprising a body a circular aperture in the body, a rotary metering member mounted in the circular aperture in said body, and a slot in he body open to said aperture, said metering member being movable along its rotary axis between an in-use position and an out-of-use position from which the metering member may be withdrawn from the body through said slot in a direction transverse to said rotary axis.

2. A metering device as claimed in claim 1, in which the member is axially adjustable in its in-use position so as to vary the metering effect.

3. A metering device as claimed in claim 1 in which the metering member includes a fluted portion for conveying seed, and a substantially cylindrical portion.

4. A metering device as claimed in claim 3, in which, in use, the metering member is restrained from moving from the in-use position to the out-of-use position by a spring clip.

5. A metering device as claimed in claim 4, in which a cutoff flap is provided which is spring biased towards said cylindrical portion.

6. A metering device as claimed in claim 3, in which the fluted portion has an extension mounted on a shaft and rotatable within the cylindrical portion, and a locking ring is provided which prevents axial movement of the cylindrical portion relative to the extension.

7. A metering device as claimed in claim 3 in which the fluted portion is slidably mounted in a sealing disc.

8. A metering device as claimed in claim 7, in which the body includes a pair of parallel sidewalls of which one has a circular aperture of substantially the same diameter as that of the sealing disc and has a slot open to said aperture and having a width substantially the same as the diameter of said cylindrical portion, and the other of which has a similar aperture and slot having a diameter and width, respectively, substantially the same as the diameter of the cylindrical portion and the width of said shaft, so that, when the metering member is in said in-use position, it is journalled in said apertures, and, when the metering member is in said out-of-use position, the cylindrical portion and the shaft are opposite the slots, and the metering member may be withdrawn from the body through the slots in a direction transverse to said rotary axis.

9. A metering device as claimed in claim 4, in which said spring clip is substantially U-shaped.

10. A metering device for seed comprising a body and a rotary metering member including a fluted portion for conveying seed and a substantially cylindrical portion mounted in said body, said metering member being movable along its rotary axis between an in-use position and an out-of-use position from which the metering member may be withdrawn from the body in a direction transverse to said axis, and a removable spring clip to restrain the metering member from moving from the in-use position to the out-of-use position.

* * * * *